Dec. 10, 1940.  J. T. HEATHMAN ET AL  2,224,345
FLUID SEPARATOR
Filed May 12, 1938  2 Sheets-Sheet 1
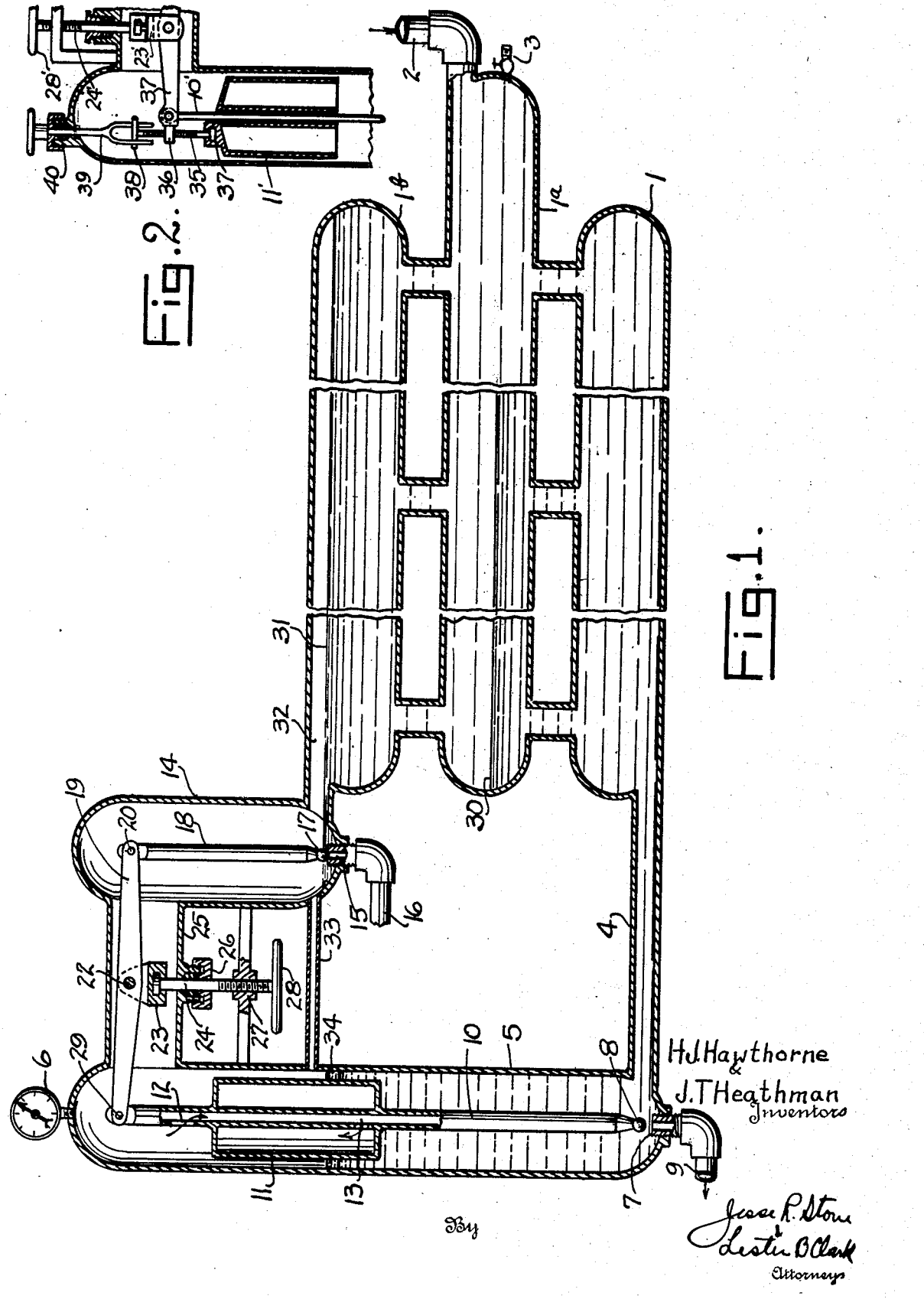

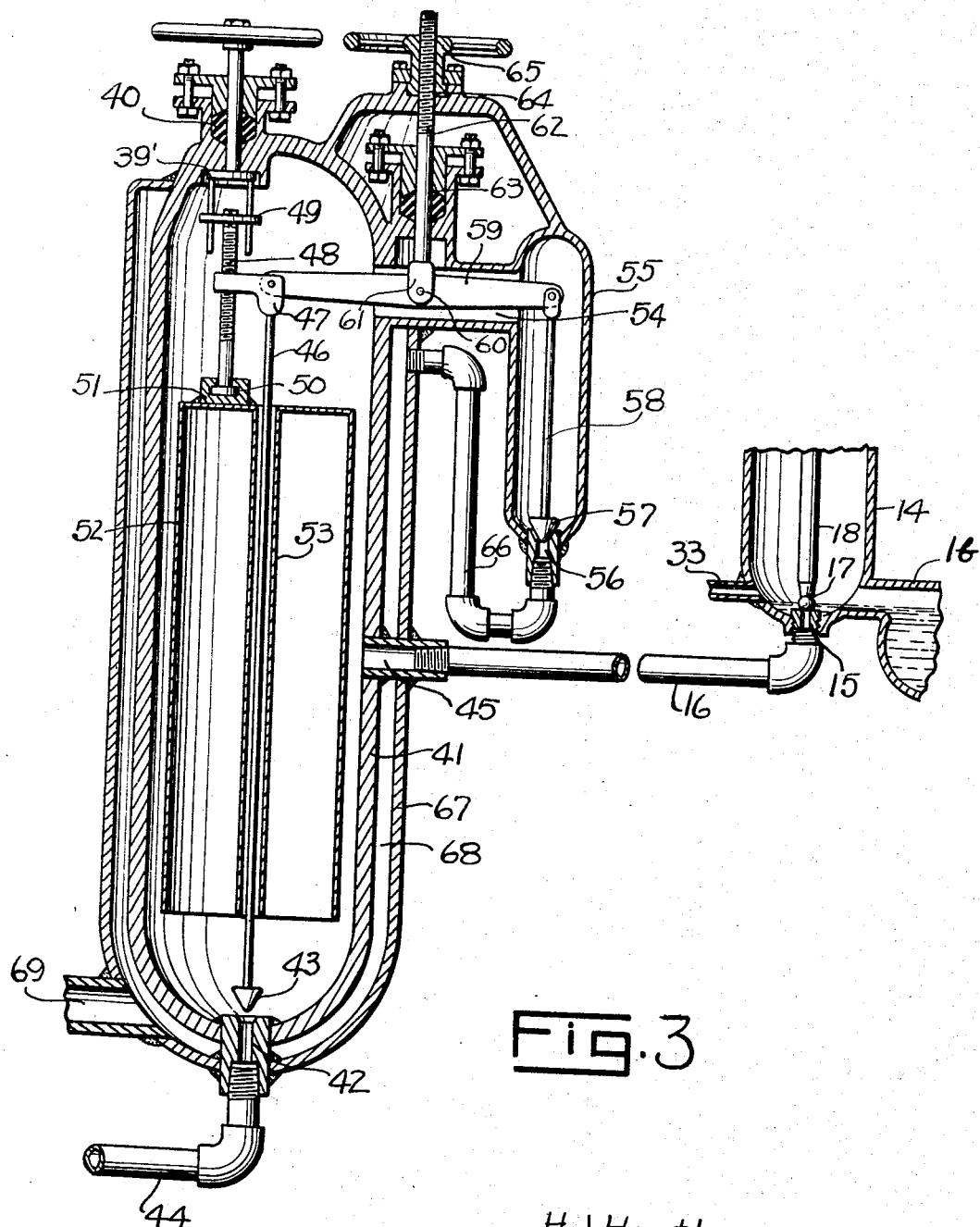

Patented Dec. 10, 1940

2,224,345

UNITED STATES PATENT OFFICE 2,224,345

FLUID SEPARATOR

James T. Heathman and Herbert J. Hawthorne, Conroe, Tex.

Application May 12, 1938, Serial No. 207,588

6 Claims. (Cl. 183—2.7)

Our invention relates to devices for separating fluids of different specific gravities. It is adapted particularly for use in separating fluids coming from oil wells and has for its general object the separation of oil, gas and water, or any two of these fluids.

It is an object of the invention to provide a device to receive the flow of fluids from oil wells and separate and discharge the fluids thus separated automatically to separate containers.

It is a further object of the invention to provide a separating device wherein a plurality of valves controlling the outlet of the fluid from the well may be operated through one float.

It is another object of the invention to provide means whereby the valves controlling the outlets may be adjusted from the exterior of the apparatus whenever it becomes necessary to do so in controlling the flow.

It is further object of the invention to separate the fluids coming from the well under pressure so that, where the fluids are emulsified, the emulsion will be broken up while under the pressure and thus allow the complete separation of said fluids due to different specific gravities.

We desire to provide an apparatus whereby adjustments both of the float and the valve members may be easily made so that regulation of the apparatus may be readily accomplished.

We also aim to employ the gas under pressure to cause the cooling of the oil upon expansion of the gas in our apparatus. The gas is thus maintained dry and the volatile constituents maintained in the oil.

In the drawings, Fig. 1 is a sectional view of an apparatus for carrying out our invention, said apparatus being shown somewhat diagrammatically.

Fig. 2 is a broken detail illustrating another embodiment of the float apparatus and the method of adjusting the same.

Fig. 3 illustrates additional apparatus which may be used.

We contemplate receiving the fluid from the well within a separating tank 1, which may, as shown in Fig. 1, comprise a plurality of separate containers 1, 1a and 1b, arranged in superposed position and connected with each other for the better separation by gravity of the fluids coming from the well. The fluid coming from the well enters the separating tank through a pipe 2 and it is to be understood that the fluid may be a mixture of oil, water and gas, or, where water is not present, of simply oil and gas. The fluid coming from the well is ordinarily under pressure and the operation of the device relies to some extent upon there being sufficient gas pressure coming with the fluid from the well to assist in the operation of the device. We contemplate, however, that where sufficient gas pressure is not present the inlet will be temporarily cut off and pressure fluid may be pumped into the tank from an outside source and an inlet is provided at 3 whereby this may be done. It may be understood therefore that a compressor or pump may be employed to force fluid under pressure into the separating tank through the inlet pipe 3.

The lower chamber 1 of the separating tank is connected through a pipe 4 to a float reservoir 5. As this reservoir is designed particularly to contain water or liquid of heavier specific gravity it is somewhat elongated and has at its upper end a pressure gauge 6.

At the lower end of the float reservoir 5 is an outlet 7, the upper end of which forms a seat for a valve 8. The outlet pipe 7 is for the discharge of liquid through the outlet pipe 9.

The valve 8 is mounted upon a valve stem 10. This stem is shown as being hollow and has thereon a float 11 positioned on the valve stem in proper position to be acted upon by the liquid in the tank at the proper time to raise the valve 8 from its seat. We have shown in Fig. 1 a hollow float member made up of sheet metal and having communication with the interior of the reservoir 5 through an opening 12 in the rod above the float and opening 13 in the rod within the float. This arrangement is made so that gas or fluid pressure within the reservoir may be equalized outside and inside of the float so that there will be no danger of collapsing the float under high fluid pressures.

The upper chamber 1b of the separating tank is connected with a gas reservoir 14. Said reservoir is shorter in length than the float reservoir and is positioned with its outlet 15 materially above the lower end of the reservoir 5. Said outlet 15 is to control the flow from the apparatus of the fluid of lighter specific gravity, such as oil or gas, to the flow pipe 16. The outlet 15 is controlled by means of a valve 17 mounted upon a valve rod 18, which is connected at its upper end to a rocker arm 19. The connection is through a pivot pin 20, which allows the swinging of the rod relative to the arm.

The rocker arm 19 is pivoted between its ends at 22 upon a supporting bracket 23 which has a swivel connection with the upper end of an adjusting rod 24. Said rod is extended upwardly through the wall of a housing member 25 connecting the two reservoirs 5 and 14. There is a stuffing box 26 around the rod 24 to prevent leakage around the stem. Said stem is threaded adjacent its lower end within a nut or bushing 27 connected at its ends to the two reservoirs. A hand wheel 28 is formed on the end of the rod so that said rod may be screwed within the nut 27 so as to adjust the position of the rocker arm. The end of said rocker arm remote from the valve rod 18 is attached at 29 to the valve rod 10.

When the fluid coming from the well under pressure includes water, gas and oil in varying quantities it will be discharged into the separating tank. The pressure of the gas in the tank will cause a separation of the emulsified oil and water so that they will settle apart by gravity. The water level in the container is indicated by the numeral 30. The oil level is indicated by the numeral 31 and it will be understood that the space 32 above the oil is filled with gas under material pressure. The separation by gravity will take place automatically and the water will pass through the pipe 4 to the water outlet 7. The oil will, where the level is high enough, reach the outlet 15 and when said outlet is open will drain out through the pipe 16. The gas will find an outlet also through the pipe 16.

It will be seen that the valves 8 and 17 will not be opened simultaneously. When the level of the oil in the float reservoir 5 is sufficient to raise the float member 11 upwardly it will open the valve 8, as shown in Fig. 1, and allow the water to drain out. The lowering of the water in the reservoir 5 will allow the float and the valve to drop downwardly and close the opening 7 and simultaneously open the outlet 15 in the gas reservoir. This operation of the valve is performed abruptly due to the surge of the liquid within the tank. When the valve 8 is off its seat the water will discharge rapidly through the outlet at that point and the level of the liquid in the separating tank will tend to be lowered and there will be a surging of the liquid from the separating tank to the float tank so that the valve will be opened and closed periodically.

When the flow of water has stopped the oil will flow out through the opening 15 and as the level of the oil is depressed the gas will also pass out through this outlet. There is a connection between the gas reservoir and the float reservoir through the pipe 33. This connection is above the oil outlet 15 and also above the normal level of the water in the reservoir 5. There is a tendency for oil to condense out of the gas around the float 11 and to be deposited on the upper surface of the water in the float tank 5, as indicated at 34 in the drawings. When this oil thus condensed upon the water reaches a material amount it may flow through the pipe 33 to the gas reservoir and find an outlet with the oil through the opening 15.

The float member may be constructed as shown in Fig. 2 where the float member 11' is open at the lower end and closed at the upper end. Furthermore, the float may be adjustable along the valve rod 10' to any desired level through an adjusting rod 35. Said rod is threaded through a nut 36 formed on the end of the rocker arm 37. The lower end of the rod has a swivel connection at 37a with the float. The upper end of the rod has a cross member 38 thereon which may be engaged by the forked lower end 39 of a wrench 40. Said wrench has a fluid tight connection through the upper end of the float tank so that it may be rotated from outside of the tank. In this manner the adjusting rod 35 may be rotated when desired to screw the float member up and down along the valve rod to regulate its position within the float tank.

In Fig. 2 we have also shown how the bracket 23' may be adjusted by means of a rod 24' extending upwardly through the wall of the reservoir and adapted to be manipulated by means of a handle member 28'.

It will be obvious that the changes made in the float and the rocker arm will not materially change the operation of the device. It does, however, make it possible to adjust the operation of the apparatus to better advantage without the necessity of opening up the apparatus.

When water is not present with the fluid coming from the well we have the problem of separating the oil from the gas and in such case the present apparatus will be adjusted slightly and the separation can take place as before. It will be desirable to adjust the float further down along the valve rod 10 so that it will be caused to rise and open the outlet for the oil through the flow pipe 9. The gas will find an outlet entirely through the outlet 15 from the gas reservoir.

It is desirable, in separating the gas from the oil, to obtain as dry a gas as possible and also to maintain the oil at a low temperature to prevent volatilization of the lighter constituents. The apparatus shown in Fig. 3 is intended for use in combination with the apparatus of Fig. 1 or it may be used in connection with wells producing no oil-water emulsion. We have illustrated it as adapted to receive the oil and gas from the pipe 16 issuing from the reservoir, 14.

The oil and gas separator includes an oil chamber 41, which is in its general construction similar to the water reservoir 5. It has an outlet 42 at its lower end, the upper end of which is formed into a valve seat to receive the valve 43. The outlet 42 is connected with an oil flow pipe 44 which may be understood as leading to a place of storage. The oil and gas flowing through the pipe 16 enters the chamber 41 through the inlet 45.

The valve 43 is formed at the lower end of a valve rod 46, which is connected at its upper end to an arm 47. Said arm is extended laterally and threaded to engage with a threaded rod 48. The rotation of said rod 48 will screw the arm 47 up or down, depending upon the direction of rotation thereof.

The threaded rod 48 has secured to its upper end a rigid cross arm 49 which may cooperate with a wrench 39' similar in general construction to the arm 39 disclosed in Fig. 2. The lower end of the rod 48 has a head 50 thereon which has a swivel connection with the upper end 51 of a float member 52.

Said float has its upper end closed and its lower end open, as in the Fig. 2 type of float. Said float has a central tubular member 53 to allow the passage longitudinally of the float of the valve rod 46. By this arrangement it will be understood that the level of the float relative to the valve rod may be varied to adjust the operation of the device. Connected with the upper end of the oil chamber 41 by way of a lateral passage 54 is a chamber 55. Said chamber has an outlet 56 at its lower end, the flow therethrough being controlled by a valve 57 mounted upon a valve rod 58.

The two valves 46 and 58 are connected by a rocker arm 59. Said rocker arm is pivoted upon a fulcrum pin 60 supported by a yoke 61 at the lower end of the adjusting rod 62. Said adjusting rod has a fluid tight connection 63 through the upper wall of the chamber 54. It is threaded at 64 to engage with a rotatable nut 64 by means of which the rod may be raised and lowered to vary the position of the rocker arm 59. In this manner we are able to adjust the position of the valve relative to their seats so as to get an accurate operation of the valves.

The gas passing the outlet 56 is carried through the pipe 66 to an outer housing 67 for the gas chamber 41. Said housing is spaced from the wall of the oil chamber to form between the same and the oil chamber a space 68, which is adapted to receive the gas from the gas chamber. It will be understood that gas coming through the pipe 66 will be under pressure not materially reduced from the well pressure and this may, of course, be as high as two thousand pounds per square inch or more.

As the gas enters the chamber 68 surrounding the oil chamber it will expand and be materially cooled. The space 68 will therefore be filled with gas under a temperature lower than the normal atmospheric temperature and will serve to cool both the oil and the gas. The gas expanding in the chamber 68 may find an outlet through the pipe 69 adjacent the lower end of the housing 67.

It will be understood that this device will operate in a manner similar to the devices previously described. The oil accumulating in the oil chamber 41 will gradually raise the float 52 and thus tend to raise the valve 43 from its seat and allow the draining out of the oil. When the oil valve is raised the gas valve 57 will be closed and gas will accumulate in the oil chamber 41 and pass through the passage 54 into the gas chamber. When the oil level has been lowered the oil outlet will be closed and the gas outlet opened and gas will pass through the pipe 66 to the cooling chamber within the housing 67 and will pass out through the pipe 69 to a place of storage.

By means of this structure we are not only enabled to separate the oil from the gas but we are enabled to cool the oil in the oil chamber and also materially cool the gas. The result will be that the gas will be comparatively dry and the oil will maintain the volatile constituents therein and will pass in a relatively cool condition into the oil flow line. It is of material value to maintain the oil in a cool condition as it is flowed into the tank due to the fact that the loss of the volatile portions thereof is materially decreased and a higher grade of oil is obtained.

It will be noted that the device as thus arranged is exceedingly simple in construction. It will cause the separation of the fluids from the well so that they will be automatically discharged without any danger of their being mixed at the outlets from the tank.

The automatic features of our device make it unnecessary for an attendant to give any close attention to the operation thereof. The oil, water and gas will each be separated from the other fluids from the well and may be directed to the proper flow lines leading to the place of storage. Furthermore, we are able to maintain a low temperature of the oil and gas as it is discharged from the apparatus which thus increases the value both of the oil and the gas in that the gas is a dry gas while the oil retains its volatile portion unimpaired.

We claim:

1. In a fluid separator including, a separating tank for fluids under pressure having gas and float reservoirs connected therewith and having outlets, said outlet from said gas reservoir being at a higher level than the outlet from said float reservoir, and with valves in said outlets, the combination of valve rods on said valves, an approximately horizontal rocker arm connecting said rods, means to adjust the level of said rocker arm and a float on the valve rod in said float reservoir.

2. In a fluid separator, a separating tank to receive fluid from a well under pressure, a gas and oil reservoir connected with the upper end of said tank to receive fluid therefrom, a float reservoir for oil and water connected with the lower end of said tank, outlets at the lower ends of said reservoirs, a walking beam, means to adjustably support said beam, valve rods at the opposite ends of said beam, a float on the valve rod in said float reservoir, a valve on each rod adapted to engage within one of said outlets, and an approximately horizontal passage from said float reservoir to said gas and oil reservoir spaced slightly above the outlet from the latter reservoir.

3. In a fluid separator, a separating tank to receive fluid from a well under pressure, a gas and oil reservoir connected with the upper end of said tank to receive fluid therefrom, a float reservoir for oil and water connected with the lower end of said tank, outlets at the lower ends of said reservoirs, a walking beam, means to adjustably support said beam, valve rods at the opposite ends of said beam, a float on the valve rod in said float reservoir, a valve on each rod adapted to engage within one of said outlets, and an approximately horizontal passage from said float reservoir to said gas and oil reservoir spaced slightly above the outlet from the latter reservoir, said float being slidable on the valve rod in said float chamber, and means to adjust vertically the position of said float on said rod.

4. In a fluid separator including a separating tank to receive fluids under pressure, a float reservoir the lower end of which is on approximately the same level as said tank, a pipe connecting the lower end of said reservoir with said tank, a gas reservoir connected with the upper end of said tank, fluid conducting means connecting the lower end of said gas reservoir and said float reservoir, outlets from said reservoirs for fluid, valves at said outlets, the outlet from said gas reservoir being approximately on a level with the upper end of said tank, valve rods on said valves, a rocker arm connecting the upper ends of said rods, a float on said valve rod in said float chamber and means to adjust the level of said rocker arm and said rods.

5. In a fluid separator including, a separating tank for fluids under pressure having a gas reservoir connected with the upper end thereof and a float reservoir connected with the lower end thereof, outlets at the lower ends of said reservoirs, valves at said outlets, said outlet from said gas reservoir being at a higher level than the outlet from said float reservoir, and approximately even with the upper end of said tank, valve rods on said valves, an approximately horizontal rocker arm connecting said rods and housed in said reservoirs, means to adjust the level of said rocker arm and a float on the valve rod in said float reservoir.

6. In a fluid separator including, a separating tank for fluids under pressure, gas and float reservoirs connected therewith, outlets from said reservoirs, said outlet from said gas reservoir being at a level even with the upper end of said tank, the outlet from said float reservoir being on a level with the lower end of said tank, valves in said outlets, valve rods on said valves, a rocker arm connecting said rods, means to adjust the level of said rocker arm, a float on the valve rod in said float reservoir and means to adjust the position of said float along said rod.

HERBERT J. HAWTHORNE.
JAMES T. HEATHMAN.